US012607240B2

(12) United States Patent     (10) Patent No.: US 12,607,240 B2

Bahmata et al.     (45) Date of Patent: Apr. 21, 2026

(54) RELEASE OPERATION OF A SLIDING CALIPER AND A BRAKE SYSTEM THEREFOR

(71) Applicant: AKEBONO BRAKE INDUSTRY CO., LTD., Tokyo (JP)

(72) Inventors: Aurelian Bahmata, South Lyon, MI (US); Swanand Velankar, Farmington Hills, MI (US); Philip Nathanael Jedele, Ypsilanti, MI (US)

(73) Assignee: AKEBONO BRAKE INDUSTRY CO., LTD., Tokyo (JP)

( * ) Notice: Subject to any disclaimer, the term of this patent is extended or adjusted under 35 U.S.C. 154(b) by 623 days.

(21) Appl. No.: 17/966,239

(22) Filed: Oct. 14, 2022

(65) Prior Publication Data

US 2024/0125363 A1     Apr. 18, 2024

(51) Int. Cl.
| | |
|---|---|
| *F16D 65/00* | (2006.01) |
| *F16D 55/226* | (2006.01) |
| *F16D 65/18* | (2006.01) |
| F16D 125/40 | (2012.01) |

(52) U.S. Cl.
CPC ....... *F16D 65/0043* (2013.01); *F16D 55/226* (2013.01); *F16D 65/18* (2013.01); *F16D 2125/40* (2013.01)

(58) Field of Classification Search
CPC .... F16D 65/0043; F16D 65/18; F16D 55/225; F16D 2125/40
USPC ... 188/72.1, 72.3, 72.4, 72.6–72.8, 156–164, 188/196 D
See application file for complete search history.

(56) References Cited

U.S. PATENT DOCUMENTS

| | | | |
|---|---|---|---|
| 4,036,330 | A | 7/1977 | Henning et al. |
| 10,288,137 | B2 | 5/2019 | Chelaidite et al. |
| 10,927,910 | B2 * | 2/2021 | Ritter ...................... F16D 55/36 |
| 2017/0130788 | A1 | 5/2017 | Noguchi et al. |
| 2018/0058524 | A1 | 3/2018 | Suzuki et al. |
| 2018/0245645 | A1 | 8/2018 | Thomas et al. |
| 2018/0283511 | A1 | 10/2018 | Tashiro |
| 2020/0263748 | A1 * | 8/2020 | Ritter ................... F16D 55/226 |
| 2021/0348663 | A1 | 11/2021 | Lou et al. |
| 2023/0286480 | A1 * | 9/2023 | Kato ...................... B60T 1/065 |

FOREIGN PATENT DOCUMENTS

| | | |
|---|---|---|
| CN | 110219910 A | 9/2019 |
| DE | 102018102511 A1 | 8/2019 |

OTHER PUBLICATIONS

Internation Search Report and Written Opinion, PCT Application No. PCT/IB2023/060179 dated Jan. 23, 2024.

* cited by examiner

*Primary Examiner* — Christopher P Schwartz

(74) *Attorney, Agent, or Firm* — The Dobrusin Law Firm, P.C.

(57) ABSTRACT

A brake system and a method of performing a release operation with the brake system. The brake system comprises a sliding caliper body and a fixed caliper body. The fixed caliper body has a stop formed therein and accommodates a spindle nut that mates with the stop in a release operation. The brake system comprises a spindle that drives the spindle nut in a second direction during the release operation. Continued translation of the spindle after mating of the spindle nut with the stop drives the sliding caliper body in a first direction opposing the second direction.

20 Claims, 8 Drawing Sheets

1

RELEASE OPERATION OF A SLIDING CALIPER AND A BRAKE SYSTEM THEREFOR

FIELD

The present teachings generally relate to a release operation of a sliding caliper and a brake system providing the same.

BACKGROUND

Brake systems with an electric park brake ("EPB") perform an apply operation in which a piston is driven toward a rotor, and a release operation in which a piston is driven away from a rotor. The release operation can provide two functions. First, to release a braking force from a rotor during normal vehicle operation. Second, for reset of the electric park brake. Reset typically occurs for the replacement of worn brake pads, whereby the friction material thereon has reduced in thickness relative to new brake pads, or otherwise as required (e.g., servicing a rotor, pistons, etc.). Particularly in the former circumstance, reset provides a clearance between a caliper and a rotor that allows technicians to remove the caliper from the knuckle. Within the clearance, new brake pads having a greater thickness relative to worn brake pads, can be accommodated. Thus, during a reset operation a greater clearance is typically required relative to the running clearance that is achieved after releasing a braking force from a rotor during normal vehicle operation.

Some electric park brake systems perform a reset by angularly translating a spindle to cause a spindle nut to retract until a radial stopper of the spindle nut engages with a radial stopper of a spindle along which the spindle nut axially translates. An example of this arrangement is described in U.S. Pat. No. 10,288,137 B2, incorporated herein by reference in its entirety for all purposes. The radial stoppers can prevent a wedge locking effect between the spindle nut and the spindle or caliper structure. Absent the radial stopper, torque applied by the spindle and frictional forces between the spindle nut and the spindle or caliper structure can cause the spindle nut to lock in place against the spindle or caliper structure. However, in certain conditions radial stoppers can be subject to the wedge locking effect themselves. In some brake systems, radial stoppers are in the form of projections that are ideally configured to contact in an angular direction. Due to the threaded engagement between the spindle and spindle nut, the spindle radial stopper angularly translates while the spindle nut radial stopper approaches the spindle nut radial stopper by axial translation. Thus, if the radial stoppers are not angularly located properly with respect to the threading, the radial stopper of the spindle nut can axially impact a surface of the radial stopper of the spindle and wedge itself thereon. The radial stoppers are typically machine-fabricated components which require specialized fixtures and fabrication processes to ensure a correct match between the spindle and the spindle nut, relative to the threading thereof.

In brake systems with sliding calipers, a sliding caliper body acts upon a first brake pad (e.g., an outboard brake pad) in response to a braking force applied to a second brake pad (e.g., an inboard brake pad) via a piston driven by a spindle nut. During a reset, the spindle nut will axially move in a release direction until its radial stopper contacts the radial stopper of the spindle. At which time, relative motion of both components is captivated, and the sliding caliper body ceases to move. Thus, technicians typically have to manually adjust the sliding caliper to increase the clearance.

There is a need for a brake system and method of operating the same that stops the spindle nut, relative to the spindle, with reduced complexity of the spindle and spindle nut geometry relative to conventional radial stoppers.

There is a need for a brake system and method of operating the same that avoids the need for specialized machining of and/or tooling for the spindle and the spindle nut.

There is a need for a brake system and method of operating the same that ensures both the spindle nut and the sliding caliper body are released in a single reset operation, whereby manual adjustment of the sliding caliper can be avoided, and a faster brake servicing process can be performed.

There is a need for a brake system and method of operating the same that reduces the quantity of servicing steps relative to conventional solutions.

There is a need for a brake system and method of operating the same that provides an even and complete reset release operation for both inboard and outboard brake pads.

SUMMARY

The present teachings provide for a brake system that may address at least some of the needs identified above. The brake system may comprise a sliding caliper body and a fixed caliper body. The fixed caliper body may have a first stop formed therein and accommodate a spindle nut that contacts the first stop in a release operation. The brake system may comprise a spindle that drives the spindle nut in a second direction during the release operation. Continued translation of the spindle after contact of the spindle nut with the first stop may drive the sliding caliper body in a first direction. The first direction may oppose the second direction.

The first stop may be in the form of a step formed at least partially around a circumference of a first passage extending through the fixed caliper body. The step may extend from a radius of the first passage to a radius of a second passage. The radius of the second passage may be smaller than the radius of the first passage.

The spindle nut may comprise an engagement feature. The engagement feature may contact the first stop formed in the fixed caliper body.

The engagement feature may be in the form of a step formed at least partially around a circumference of the spindle nut. The step may extend from a first radius of the spindle nut to a second radius of the spindle nut. The second radius may be smaller than the first radius.

An end portion of the spindle nut defined by the second radius thereof may locate within the second passage.

The fixed caliper body may comprise a second stop that mates with the sliding caliper body in the release operation. The second stop may preclude further translation of the spindle and driving of the sliding caliper body in the second direction.

The second stop may be formed on an outboard portion and/or inboard portion of the fixed caliper body.

The second stop may be a boss extending from the outboard portion of the fixed caliper body.

The boss may be located between two or more of a connection member, a guide pin hole, a brake pad slot, a first cylinder, and a second cylinder.

The sliding caliper body may comprise a finger. The finger may comprise an engagement feature in the form of a recessed surface.

The brake system may comprise an inboard brake pad and an outboard brake pad adapted to locate on opposing sides of a rotor. Contact of the sliding caliper body with the second stop may provide a clearance between the outboard brake pad and the rotor that is greater than a running clearance.

The release operations of the sliding caliper body and the fixed caliper body may at least partially overlap in time.

The present teachings provide for a method for performing a release operation with a brake system that may address at least some of the needs identified above. The method may comprise driving a spindle nut, by a spindle, during a release operation in a second direction until the spindle nut contacts a fixed caliper body. The method may comprise continuing to drive the spindle to drive a sliding caliper in a first direction opposing the second direction.

The spindle nut may contact an inboard portion of the fixed caliper body.

An engagement feature in the form of a step formed in the spindle nut may mate with a stop in the form of a step formed in the fixed caliper body.

The sliding caliper body may be driven in the first direction until it contacts the fixed caliper body.

The sliding caliper body may contact an outboard portion and/or the inboard portion of the fixed caliper body.

An engagement feature in the form of a recessed surface in the sliding caliper body may mate with a stop in the form of a boss formed in the outboard portion of the fixed caliper body.

The method may comprise releasing a braking force of an inboard brake pad against a rotor by the driving of the spindle nut in the second direction. The method may comprise releasing a braking force of an outboard brake pad against a rotor by the driving the sliding caliper body in the first direction.

The release operation may be performed to reset the brake system.

BRIEF DESCRIPTIONS OF THE DRAWINGS

DETAILED DESCRIPTION

Figure 1A:
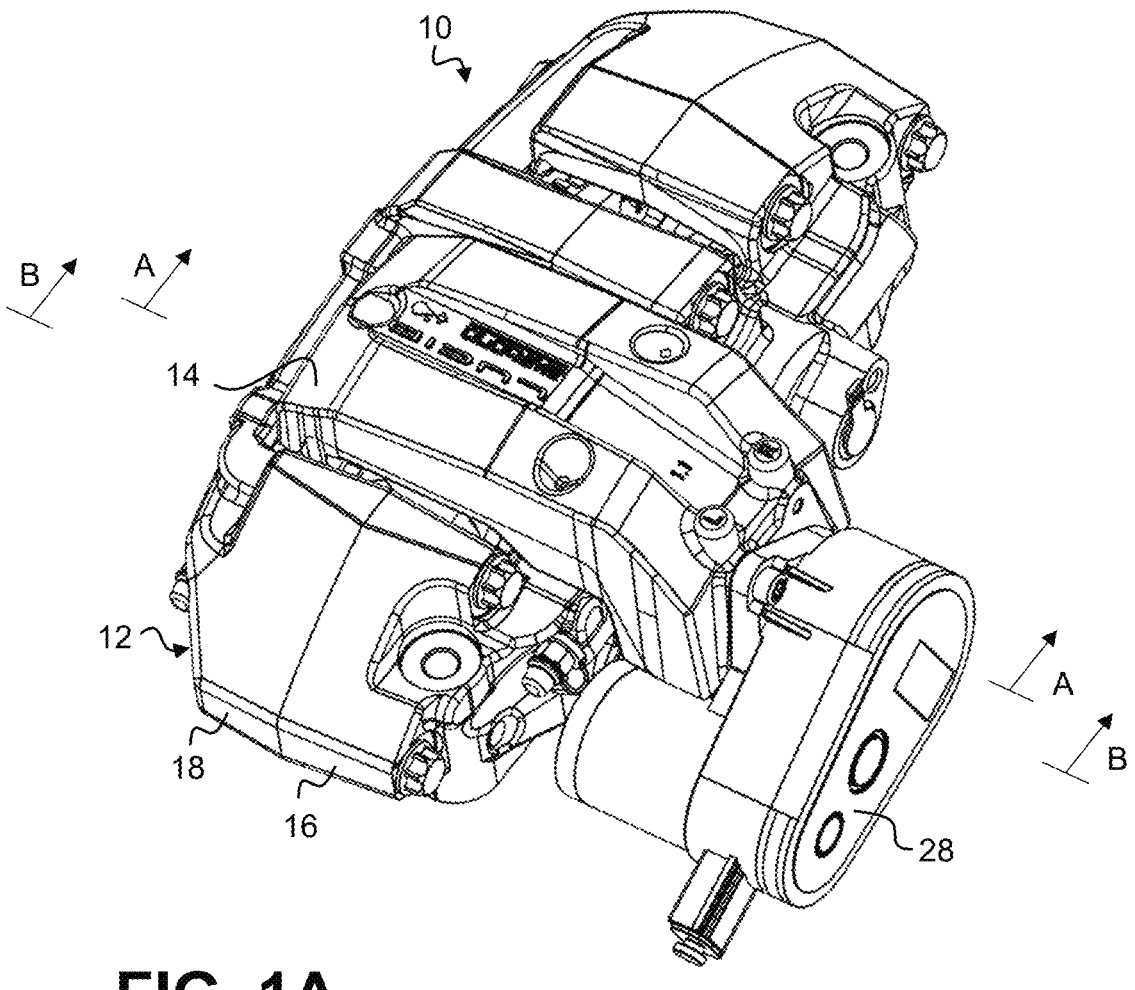
FIG. 1A is a perspective view of a brake system according to the present teachings.
Figure 1B:
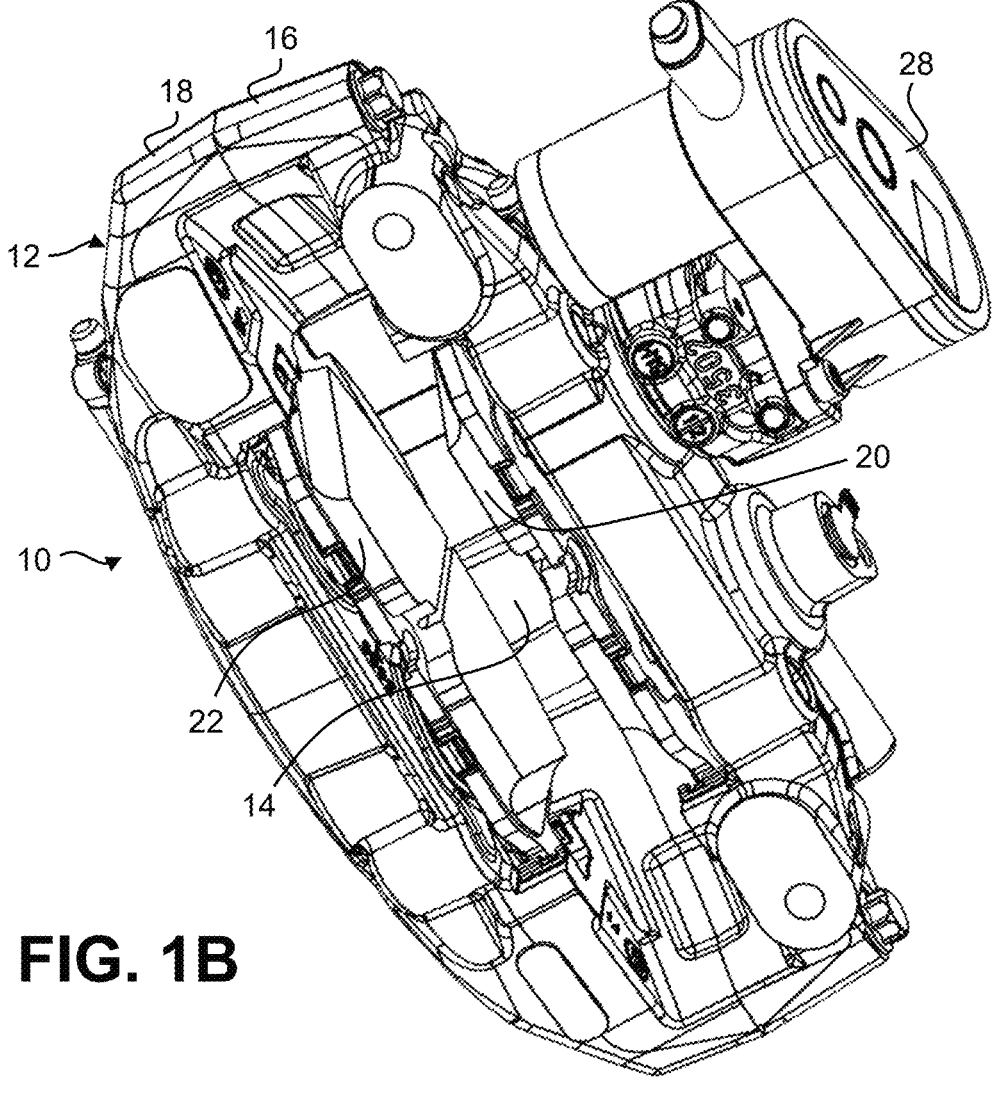
FIG. 1B is a perspective view of the brake system illustrated in FIG. 1A.

FIG. 1A and FIG. 1B illustrate a brake system 10 according to the present teachings. The brake system 10 comprises a fixed caliper body 12 and a sliding caliper body 14. The fixed caliper body 12 is affixed in position (e.g., on a knuckle) relative to a rotor (not shown). The sliding caliper body 14 moves axially inboard and outboard relative to both the rotor and the fixed caliper body 12. The fixed caliper body 12 comprises an inboard portion 16 and an outboard portion 18 and the sliding caliper body 14 extends over at least a portion of both the inboard portion 16 and the outboard portion 18.

The brake system 10 comprises an inboard brake pad 20 coupled (e.g., via clips) to the inboard portion 16 and an outboard brake pad 22 coupled (e.g., via clips) to the outboard portion 18. The brake pads 20, 22 can translate axially over a pre-determined distance relative to the inboard and outboard portions 16, 18, but remain generally captive in any other direction. The brake pads 20, 22 can be actuated toward a rotor (not shown) to apply a clamping force thereto to slow the rotor, a wheel, and/or a vehicle, bring the same to a stop, or maintain the same in a stopped position. The brake pads 20, 22 can be actuated away from the rotor to release the clamping force and allow the rotor, the wheel, and/or the vehicle to move.

Figure 2:
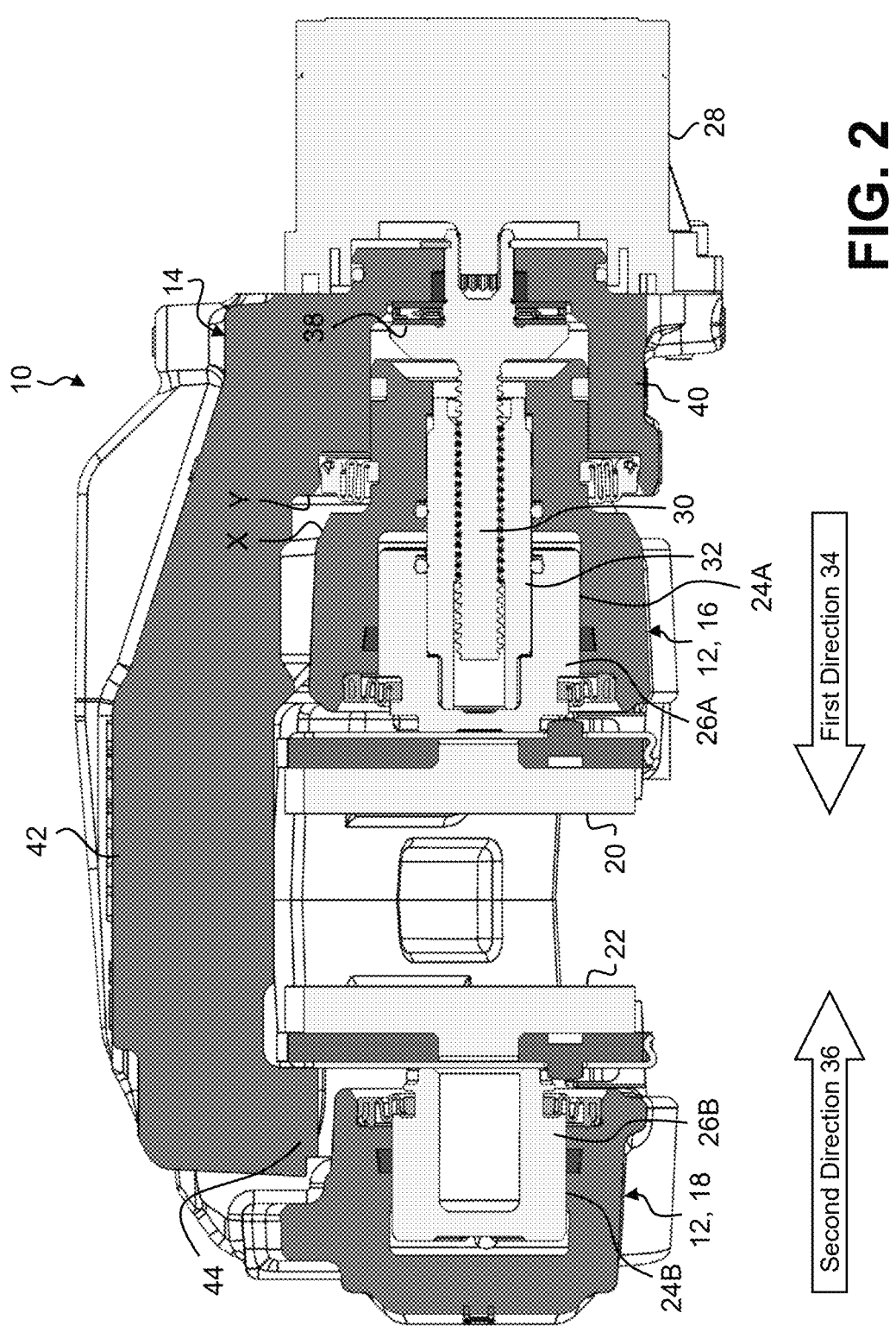
FIG. 2 is a sectional view, along line A-A, of the brake system illustrated in FIG. 1A and FIG. 1B.

The fixed caliper body 12 comprises cylinders 24A, 24B and associated pistons 26A, 26B located therein, an opposing pair of which are depicted in FIG. 2. Typically, each half a brake pad 20, 22 is actuated by a piston such that a braking force applied upon a rotor is generally symmetrical, although the present disclosure contemplates any portion of the brake pad may be actuated by any number of pistons (e.g., a single piston acting on the center of a brake pad).

As depicted in FIG. 2, the inboard piston 26A is actuated both hydraulically and electromechanically while the outboard piston 26B is actuated hydraulically. The present disclosure contemplates that the opposite arrangement may be employed. The brake system 10 comprises a motor gear unit (contained within the depicted motor gear unit housing 28 depicted in FIG. 2) to provide for electromechanical actuation.

FIG. 2 illustrates the brake system 10 of FIG. 1A and FIG. 1B. Contained within the inboard portion 16 of the fixed caliper body 12 is a spindle 30 and a spindle nut 32, which are accommodated within the inboard cylinder 24A. The spindle 30, which includes threads on the outer surface thereof, is caused to rotate, clockwise and counterclockwise, by the motor gear unit (contained within the motor gear unit housing 28). The spindle nut 32, which includes corresponding threads on the inner surface thereof, is disposed onto the spindle 30. Rotational translation of the spindle 30 causes axial translation of the spindle nut 32 via the threaded engagement therebetween. Axial translation can be in a first direction 34 and a second direction 36, which are in opposing relationship to each other.

The spindle 30 is coupled to the sliding caliper body 14. That is, axial translation of the spindle 30 and axial translation of the sliding caliper body 14, relative to the fixed caliper body 12, occur in unison. The spindle 30 rotates relative to the sliding caliper body 14. A bearing 38 (e.g., roller bearing) is located between the spindle 30 and the sliding caliper body 12 to facilitate said rotation. The sliding caliper body 14 comprises a base 40, a bridge 42, and one or more fingers 44 (e.g., two fingers 44 arranged on either side of the outboard cylinder 24B so as not to impede the outboard piston 26B). The spindle 30 is coupled to the sliding caliper body 14 at the base 40. The bridge 42 extends from the base 40, over the inboard and outboard portions 16, 18 of the fixed caliper body 12. The fingers 44 extend from the bridge 42 and into the profile of the outboard brake pad 22. Thus, angular translation of the spindle 30 can be ultimately transformed into axial translation of the outboard brake pad 22, as discussed in greater detail below.

In an apply operation, the spindle 30 drives the spindle nut 32 in the first direction 34 until the inboard brake pad 20 engages with a rotor (not shown), at which time the spindle nut 32 is captive. The spindle 30 is free to rotate and as a result to axially translate relative to the captive spindle nut 32 and is caused to do so, in the second direction 36. Due to the coupled relationship between the spindle 30 and the sliding caliper body 14, axial translation of the spindle 30 results in corresponding axial translation of the sliding caliper body 14. For example, axial translation of the spindle 30 in the second direction 36 influences axial translation of the sliding caliper body 14 in the second direction 36. As a result, the apply operation causes a clamping force to be applied to a rotor.

In a release operation, the spindle 30 drives the spindle nut 32 in the second direction 36 until the spindle nut 32 engages the fixed caliper body 12, at which time the spindle nut 32 is captive. The spindle 30 is free to rotate and as a result to axially translate relative to the captive spindle nut 32 and is caused to do so, in the first direction 34. Due to the coupled relationship between the spindle 30 and the sliding caliper body 14, axial translation of the spindle 30 results in corresponding axial translation of the sliding caliper body 14. For example, axial translation of the spindle 30 in the first direction 34 influences axial translation of the sliding caliper body 14 in the first direction 34. As a result, the release operation causes a clamping force to be released from a rotor (not shown) and a clearance between the brake pads 20, 22 and the rotor to be realized.

Figure 3A:
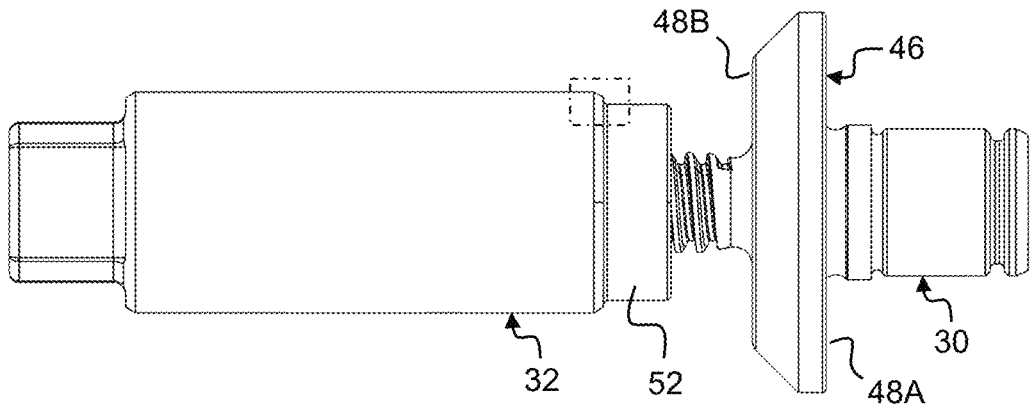
FIG. 3A is a plan view of the spindle and the spindle nut illustrated in FIG. 2.
Figure 3B:
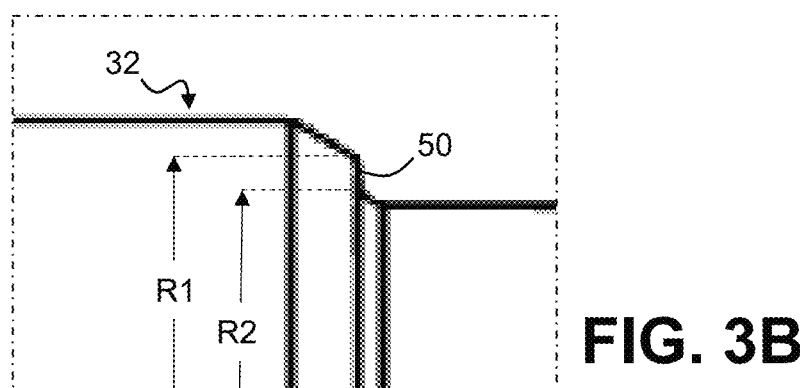
FIG. 3B is an enlarged view of the spindle nut illustrated in FIG. 3A.
Figure 3C:
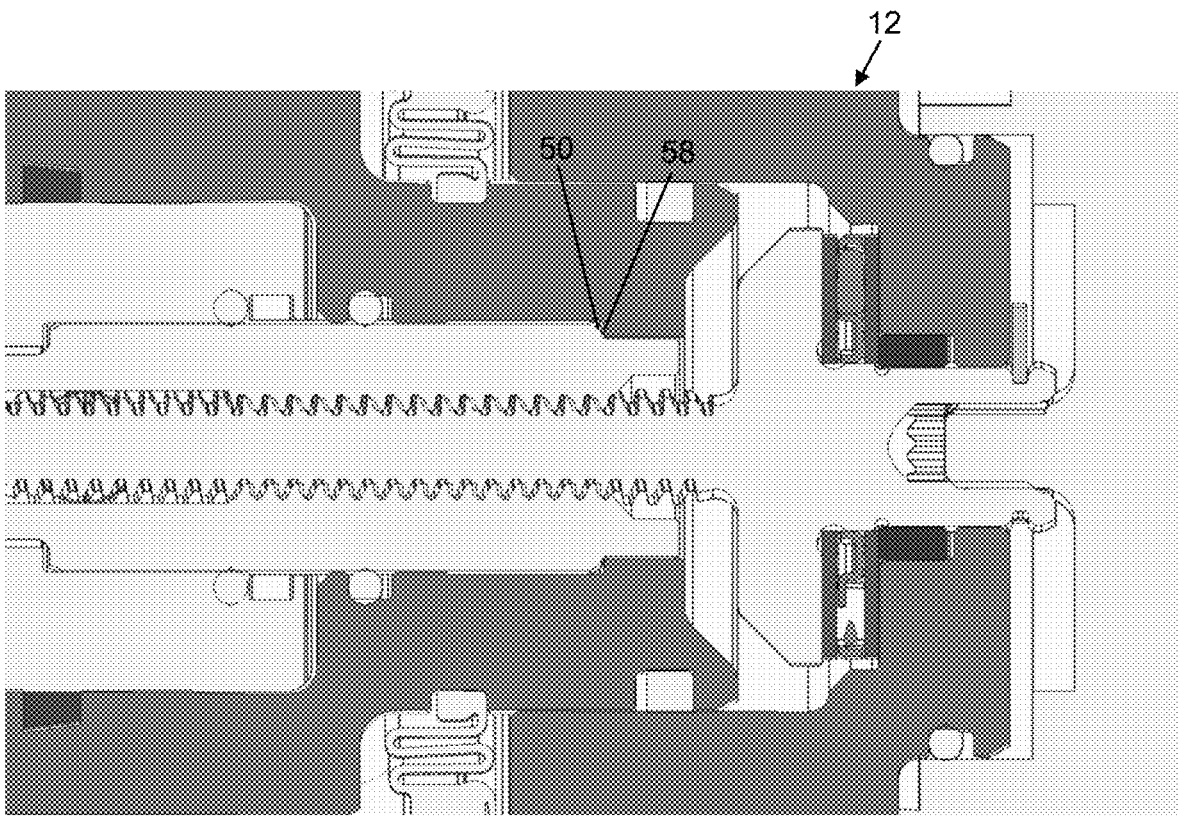
FIG. 3C is a sectional view, along line A-A, of the brake system.

FIG. 3A through FIG. 3C illustrate the spindle 30 and spindle nut 32. The spindle nut 32 has a threaded engagement with the spindle 30. The spindle 30 comprises a flange 46 extending radially from the spindle 30, the flange 46 engaging a bearing 38 on a first side 48A thereof and an opposing second side 48B thereof selectively contacting the inboard portion 16 of the fixed caliper body 12 when the spindle 30 axially translates in the first direction 34.

The spindle nut 32 comprises an engagement feature 50 in the form of a step defined between a first radius R1 and a second radius R2 of the spindle nut 32. The engagement feature 50 contacts the fixed caliper body 12, shown in FIG. 3C, in a release operation. An end portion 52 of the spindle nut 32 cooperates with a second passage 56 formed in the fixed caliper body 12, discussed below with respect to FIG. 4A.

Figure 4A:
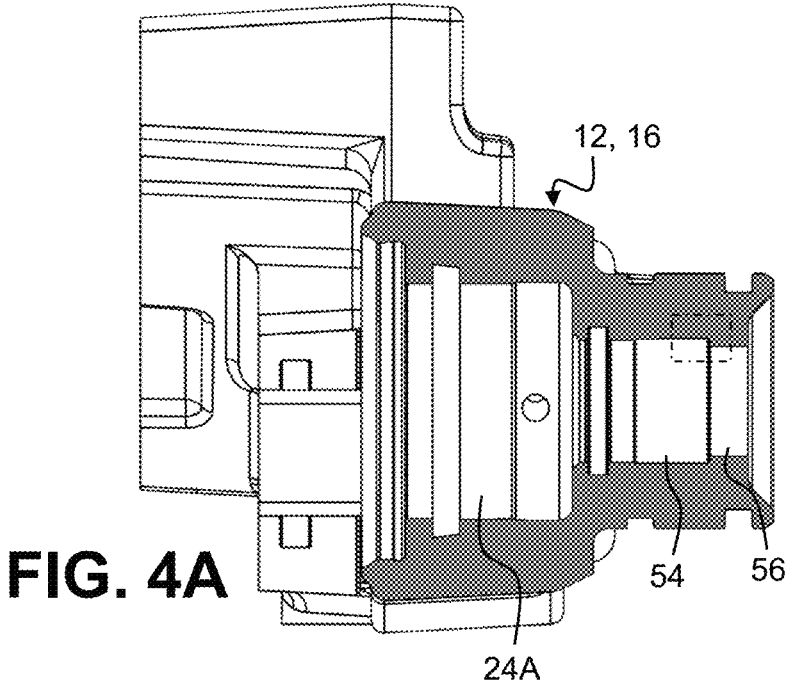
FIG. 4A is a sectional view, along line A-A, of the fixed caliper body illustrated in FIG. 1A and FIG. 1B.
Figure 4B:
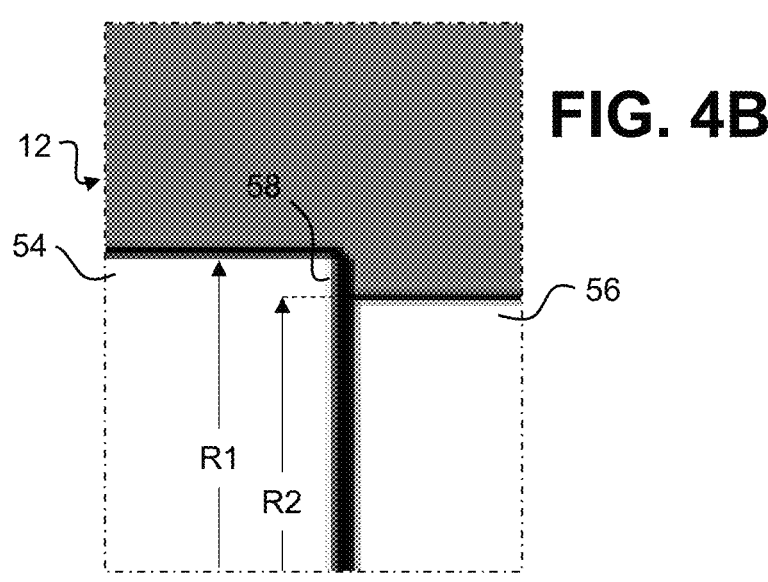
FIG. 4B is an enlarged view of the fixed caliper body illustrated in FIG. 4A.

FIG. 4A and FIG. 4B illustrate an inboard portion 16 of a fixed caliper body 12. The fixed caliper body 12 comprises an inboard cylinder 24A formed therein and a first passage 54 located inboard of the inboard cylinder 24A. The first passage 54 has a smaller radius relative to the inboard cylinder 24A. The spindle 30 extends through the first passage 54 and into the inboard cylinder 24A. The fixed caliper body 12 comprises a second passage 56 that receives the end portion 52 the spindle nut 32, illustrated in FIG. 3A. The second passage 56 has a smaller radius relative to the first passage 54. The spindle nut 32 cooperates with a piston 26A, as shown in FIG. 2.

The fixed caliper body 12 comprises a stop 58 defined by a first radius R1 of the first passage 54 and a second radius R2 of the second passage 56. In the release operation according to the present teachings, the engagement feature 50 of the spindle nut 32 contacts the stop 58 of the fixed caliper body 12 and thus the spindle nut 32 ceases its axial translation.

Figures 5A, 5B:
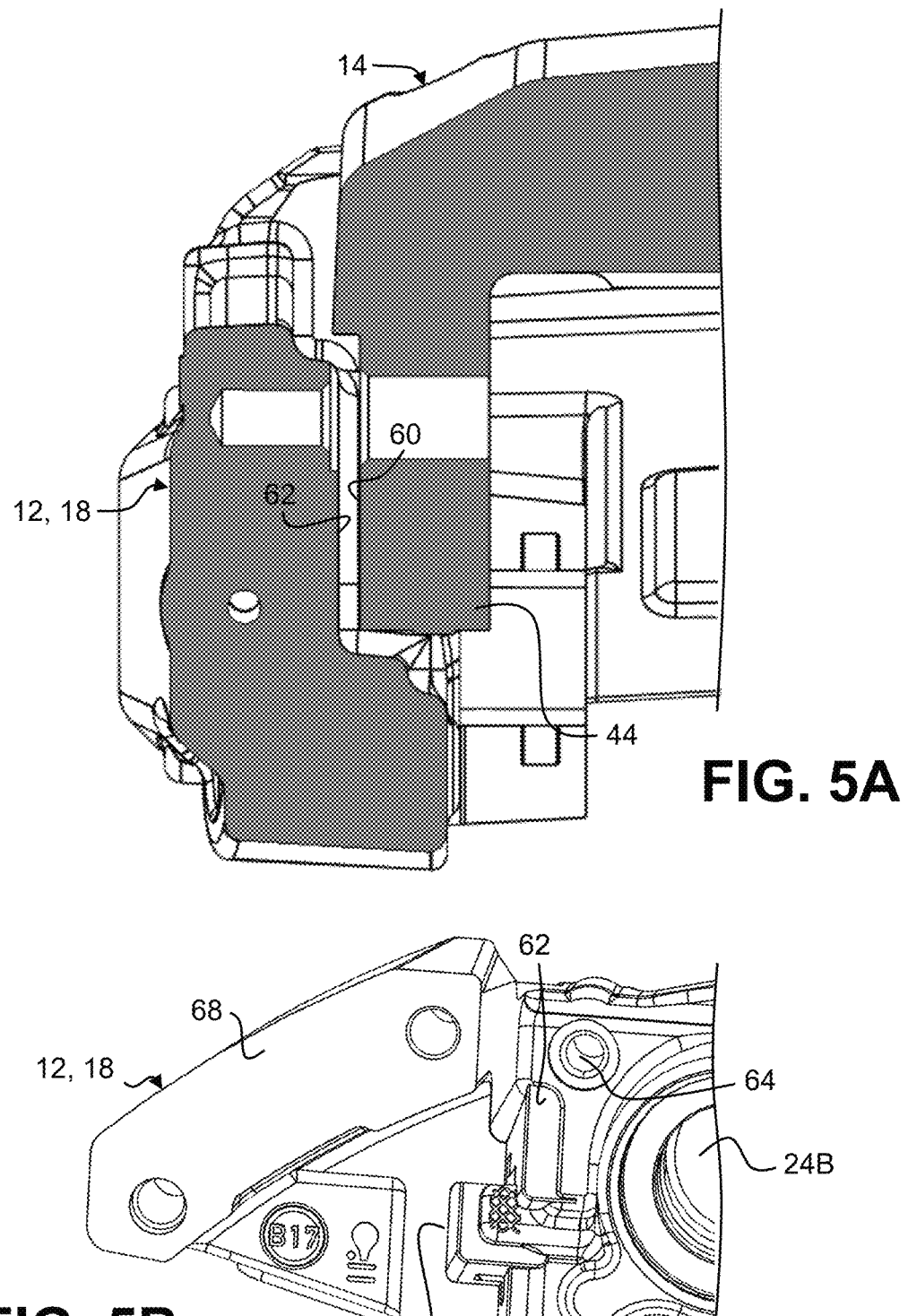
FIG. 5A is a sectional view, along line B-B, of the fixed caliper body and the sliding caliper body illustrated in FIG. 1A and FIG. 1B.
FIG. 5B is a perspective view of the fixed caliper body illustrated in FIG. 5A.
Figure 5C:
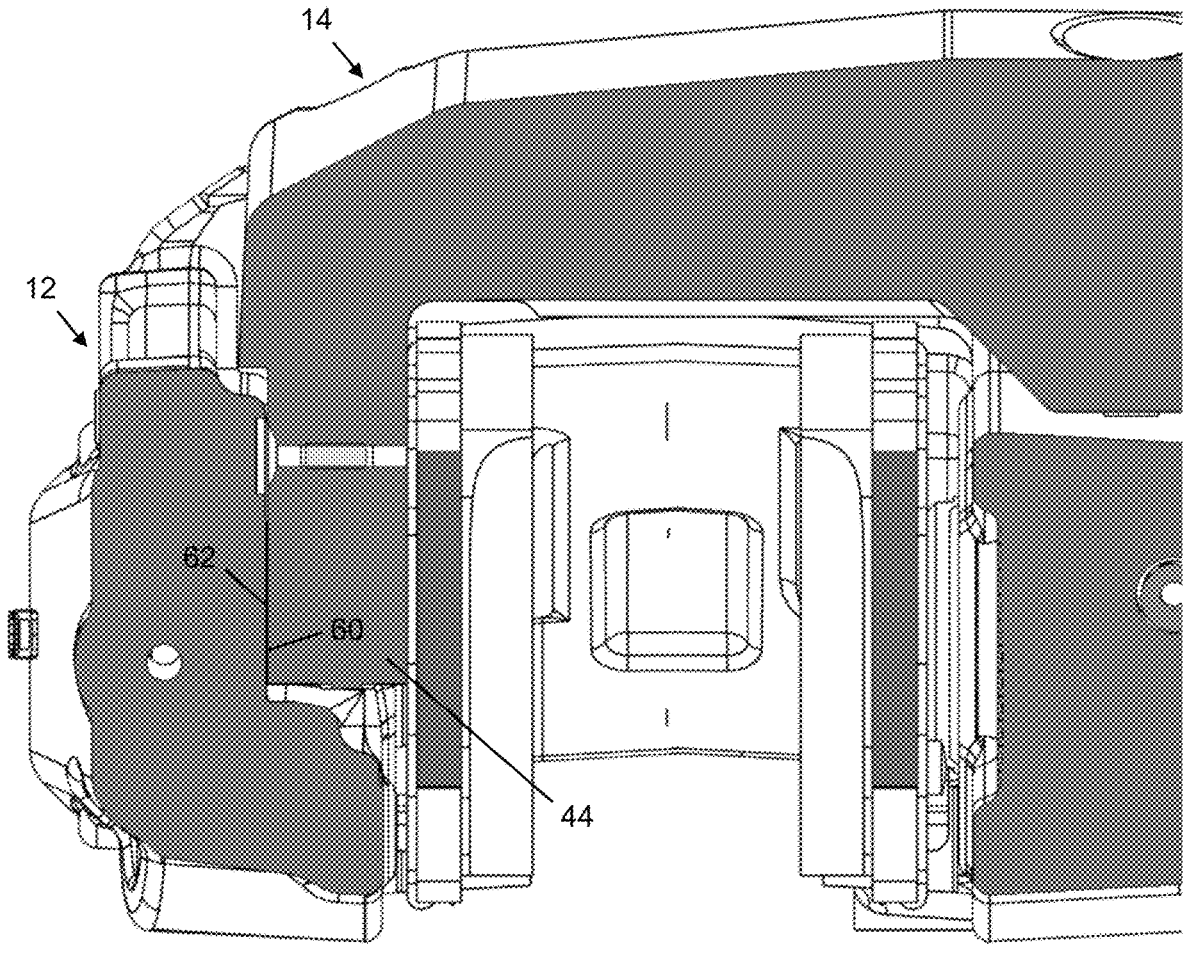
FIG. 5C is a sectional view, along line B-B, of the fixed caliper body and the sliding caliper body.

FIG. 5A through FIG. 5C illustrate the outboard portion 18 of the fixed caliper body 12, and the sliding caliper body 14. As discussed for the release operation with respect to FIG. 2, the finger 44 of the sliding caliper body 14 moves in the first direction 34 until it contacts the outboard portion 18 of the fixed caliper body 12 (FIG. 5C). In this regard, the finger 44 comprises an engagement feature 60 in the form of a machined surface and the outboard portion 18 of the fixed caliper body 12 comprises a stop 62 in the form of a boss extending from the fixed caliper body 12. The stop 62 is generally rectangular in shape. The stop 62 may have one or more rounded and/or acutely angled corners. The present teachings contemplate that the stop 62 can be formed as any shape.

It is noted that whereas the view defined by line A-A (see FIG. 1A) generally bisects the outboard cylinder 24B, the view defined by line B-B (see FIG. 1A) generally bisects the stop 62.

The stop 62 is located between the outboard cylinder 24B, a hole 64 for receiving a guide pin, a slot 66 within which a portion of a brake pad locates to secure the brake pad to the fixed caliper body 12, and a connection member 68 to which the inboard portion 16 of the fixed caliper body 12 attaches to the outboard portion 18. The present teachings contemplate that the stop 62 may be located anywhere on the outboard portion 18 of the fixed caliper body 12 that the finger 44 may contact and that does not impede any functional (e.g., moving or connecting) portion of the brake system 10. The present teachings contemplate that the stop may be located on an inboard portion of the fixed caliper body and the associated engagement feature may be formed, proximate to the fixed caliper body, on the bridge and/or base portion of the sliding caliper body. For example, the surfaces X and Y illustrated in FIG. 2 may be manipulated (e.g., by forming steps, as discussed above with respect to the first stop) to form a stop and an engagement feature, respectively.

The present teachings relate to a brake system. The brake system may comprise a sliding caliper, a fixed caliper, or both. Sliding calipers may move relative to a fixed caliper and/or a rotor. Fixed calipers may remain stationary relative to a rotor by virtue of being affixed to a vehicle structure (e.g., knuckle). At least some benefits of the present teachings may be realized in a brake system employing both a sliding caliper and a fixed caliper.

The fixed caliper may comprise one or more cylinders defined therein. The cylinders may function to accommodate pistons, receive brake fluid, accommodate a spindle and/or spindle nut, or any combination thereof. Each cylinder may comprise a piston. The pistons may axially translate within the cylinders. Such translation may be attributed to a brake fluid pressurized by a hydraulic brake system and/or a mechanical actuator (e.g., including a spindle and a spindle nut) of an electromechanical brake system.

Typically, the hydraulic brake system operates during service braking and the electromechanical brake system operates during park braking, although the present disclosure contemplates the opposite arrangement, or the hydraulic and electromechanical brake systems at least partially cooperating in operation during service and park braking.

The fixed caliper body may comprise one or more pistons. The pistons may function to drive one or more brake pads against a rotor and thus produce a braking force. Brake fluid may reside in the cylinders and pressure applied to the brake fluid may push one or more pistons toward the rotor. One or more linkages (e.g., a spindle and a spindle nut) may be driven by one or more motors. The linkages may push one or more pistons toward the rotor.

The brake system may comprise one or more spindle nuts. The spindle nut may function to engage and/or actuate a piston. The spindle nut may be located within the fixed caliper body. The spindle nut may be located within the cylinder of the fixed caliper body. The spindle nut may be coupled to the spindle. The spindle nut may have a threaded engagement to the spindle. The spindle nut may axially translate in response to rotation of the spindle.

The spindle nut may comprise a chamfer. The chamfer may be adjacent to the engagement surface of the spindle nut, discussed below. The chamfer may function to aid in the installation of the spindle nut in the cylinder of the fixed caliper body. The cylinder may comprise a gasket. Installation of the spindle nut within the cylinder may involve sliding the spindle nut against the gasket. The gasket may slide along the chamfer during installation.

The brake system may comprise one or more spindles. The spindle may function to transfer torque from a motor and/or one or more linkages disposed between the motor and the spindle to the spindle nut. The spindle may be coupled to the sliding caliper body. The spindle and sliding caliper body may axially translate in unison. The spindle may rotate relative to the sliding caliper body. One or more bearings (e.g., roller bearings) may be disposed between the spindle and the sliding caliper body. The spindle may extend at least partially into the fixed caliper body. The spindle and the sliding caliper body may axially translate relative to the fixed caliper body.

The spindle may comprise a flange. The flange may comprise a first side that engages a bearing. The flange may comprise a second side that may or may not engage the fixed caliper body in a release operation. The flange may be accepted by a recess formed in the fixed caliper body. The acceptance of the flange by the recess may not interfere with the contact of the sliding caliper body with the stop of the fixed caliper body, discussed below.

The fixed caliper body may comprise one or more passages. The passages may function to allow a spindle to extend therethrough and cooperate with the spindle nut within the cylinder, to allow a spindle nut to extend therethrough, or both.

A first passage may be adjacent to a cylinder. The first passage may be located inboard of the cylinder, where the spindle extends through an inboard portion of the fixed caliper body. The first passage may be located outboard of the cylinder, where the spindle extends through an outboard portion of the fixed caliper body. The first passage may have a radius that is less than a radius of the cylinder.

A second passage may be adjacent to the first passage. The second passage may be located inboard of the first passage, where the spindle extends through an inboard portion of the fixed caliper body. The second passage may be located outboard of the first passage, where the spindle extends through an outboard portion of the fixed caliper body. The second passage may have a radius that is less than a radius of the first passage.

The cylinder and/or passages may be cylindrical. The radii of the cylinder and the first passage may define a stop. That is, a stop may be formed by the transition of the cylinder to the first passage. The radii of the first passage and the second passage may define a stop. That is, a stop may be formed by the transition of the first passage to the second passage.

The present teachings that any quantity of passages may be employed, and each successive passage may be defined by a progressively decreasing radius defining a corresponding quantity of stops. The transition between the passages may be in the form of a step, chamfer, curved edge, or any combination thereof.

An end portion of the spindle nut may move within one or more passages, enter one or more passages in a release operation, exit one or more passages in an apply operation, or any combination thereof.

The brake system may comprise one or more brake pads. The brake pads may function to apply a frictional force to the rotor to cause the rotor and and/or the vehicle to slow down, stop, remain stationary, or any combination thereof. The brake pads may comprise a carrier (e.g., a metal plate) and a friction material disposed upon the carrier. Typically, two brake pads (e.g., an inboard brake pad and an outboard brake pad) may be employed on opposing sides of the rotor, although any quantity of brake pads acting on any side of the rotor are contemplated by the present teachings. Brake pads located on opposing sides of the rotor may clamp on the rotor.

The fixed caliper body may comprise an inboard portion and/or an outboard portion. The inboard and outboard portions may be structurally discrete elements that are fastened together (e.g., via pins, bolts or the like). The inboard and outboard portions may be integrally formed together (e.g., metal cast as a single element).

As referred to herein, inboard may mean toward the centerline of the vehicle and outboard may mean away from the centerline of the vehicle.

The sliding caliper may comprise a base, a bridge, one or more fingers, or any combination thereof. The base may be located proximate to an inboard portion of the fixed caliper body or an outboard portion of the fixed caliper body. The spindle may be rotatably coupled to the base. The bridge may extend from the base. The bridge may function to connect the one or more fingers to the base. The bridge may extend over at least a portion of the inboard and outboard portions of the fixed caliper body. The one or more fingers may extend from the bridge at an end of the bridge opposing the end of the bridge where the base is located. The one or more fingers may function to engage the fixed caliper body, one or more brake pads, or both.

During normal vehicle operation (i.e., typical driving situations), a piston actuated by a spindle nut and/or one or more fingers of a sliding caliper may axially translate to apply a force upon or release a force from brake pads. Application of force may cause the brake pads to engage the rotor. Release of force may cause brake pads to disengage the rotor and/or create a clearance between the brake pads and the rotor.

During servicing of the brake system, a piston actuated by a spindle nut and/or one or more fingers of a sliding caliper may axially translate to provide a greater clearance between the brake pads and the rotor relative to the clearance realized by normal vehicle operation. The spindle nut and/or sliding caliper may axially translate until one or more structural elements of the brake system interfere with the spindle nut and/or the sliding caliper and preclude further axial translation.

The relationship between the spindle and the spindle nut may contribute to the function of the brake system of the present teachings. The spindle may be rotated by a motor and/or one or more linkages located between the motor and the spindle. Rotation of the spindle may cause axial translation of the spindle nut. This may be achieved by a lead screw engagement or a ball screw engagement. Clockwise and counterclockwise rotation of the spindle may influence, respectively, inboard and outboard directional movement of the spindle nut, or vice versa.

The spindle may be caused to axially translate in a first direction when axial translation of the spindle nut in a second direction is restricted (e.g., by contacting one or more stops). The second direction may oppose the first direction. The spindle may be coupled to the sliding caliper body. That is, axial translation of the spindle and axial translation of the sliding caliper body may occur in unison. Thus, axial translation of the spindle may cause the same for the sliding caliper system. In this regard, the inboard and outboard brake pads may be released under reset conditions during the same operation. Release of the inboard and outboard brake pads may at least partially overlap in time or proceed one immediately after the other.

When axial translation of the sliding caliper body is restricted, both the spindle and the sliding caliper body may cease to move. Nevertheless, the motor may still operate for a time after captivation of the spindle and the sliding caliper body. This may cause current provided to the motor to increase, which can be detected. The motor may be controlled to cease operation in response to a current spike.

The present disclosure provides a brake system that employs one or more stops and engagement features that contact during a release operation associated with a system reset. The engagement features may or may not contact the stops during normal vehicle operation. The stops and engagement features may be fabricated and/or located to provide a robust and reliable release operation.

The fixed caliper body may comprise one or more stops. The stops may function to terminate axial translation of one or more elements of the brake system, initiate axial translation of one or more elements of the brake system, release force upon an inboard brake pad and an outboard brake pad during the same release operation, provide a reset operation clearance on an inboard side and outboard side during the same operation, or any combination thereof.

The fixed caliper body may comprise one or more stops on an inboard portion thereof. The inboard stop may be contacted by a spindle nut. In a release operation, the spindle nut may axially translate in a second direction until the spindle nut contacts the stop.

The fixed caliper body may comprise one or more stops on an outboard portion thereof. The outboard stop may be contacted by a sliding caliper body. The outboard stop may be contacted by one or more fingers of the sliding caliper body. In a release operation, the one or more fingers may axially translate in a first direction until the fingers contact the stop. The present teachings contemplate that the stop contacted by the sliding caliper body may be formed on the inboard portion of the fixed caliper body. Both a stop on an inboard and a stop on an outboard portion of the fixed caliper body may be contacted by the sliding caliper body.

In a release operation, contact of the spindle nut, axially translating in the second direction, with the inboard stop may initiate axial translation of the sliding caliper body in a first direction that opposes the first direction. The sliding caliper body may continue to axially translate until the sliding caliper body contacts the outboard stop and/or inboard stop.

The present disclosure contemplates that the spindle nut may be located within an outboard portion of the fixed caliper body and the one or more fingers may be located proximate to an inboard portion of the fixed caliper body, in which case the designation of outboard stop and inboard stop may be exchanged, but nevertheless the structures may remain the same as described above.

One or more stops that are contacted by the spindle nut may be located in a cylinder, in one or more passages, or both. The one or more stops that are contacted by the spindle nut may be located on the inboard portion or the outboard portion of the fixed caliper body. The stop may be in the form of a step, chamfer, curved edge, or any combination thereof. The step may comprise a flat, right-angled face which the spindle nut contacts. The chamfer may comprise a flat, obtuse-angled face which the spindle nut contacts. The curved edge may comprise an arc which the spindle nut tangentially contacts. The stop may be cast and/or machined into the fixed caliper body.

The stop may extend at least partially around a circumference of a cylinder and/or passage. The stop may extend entirely around a circumference of a cylinder and/or passage.

The stop may extend from a first radius of a cylinder and/or passage to a second radius of a cylinder and/or passage, the second radius being smaller than the first radius. Where multiple stops are employed, each may be defined by a progressively diminishing radii of a cylinder and/or passage. The distance between the first radius and the second radius may be about 0.5 mm or more, 1.0 mm or more, or even 1.5 mm or more. The distance between the first radius and the second radius may be about 3 mm or less, 2.5 mm or less, or even 2.0 mm or less.

The spindle nut may comprise one or more engagement features. The engagement feature may function to contact the stop formed in the fixed caliper body (e.g., the inboard portion). The engagement feature may include a step, chamfer, curved edge, or any combination thereof, located between opposing ends of the spindle nut. The engagement feature may include an end of the spindle nut. The step may comprise a flat, right-angled face which contacts the stop. The chamfer may comprise a flat, obtuse-angled face which contacts the stop. The curved edge may comprise an arc which tangentially contacts the stop. The engagement feature may be cast and/or machined into the spindle nut.

The engagement feature may extend at least partially around a circumference of the spindle nut. The engagement feature may extend entirely around a circumference of the spindle nut.

The engagement feature may extend from a first radius of the spindle nut to a second radius of the spindle nut, the second radius being smaller than the first radius. The distance between the first radius and the second radius may be about 0.5 mm or more, 1.0 mm or more, or even 1.5 mm or more. The distance between the first radius and the second radius may be about 3 mm or less, 2.5 mm or less, or even 2.0 mm or less.

One or more stops that are contacted by the sliding caliper body may be located on the fixed caliper body (e.g., the outboard portion). The one or more stops that are contacted by the sliding caliper body may be located on the inboard portion or the outboard portion of the fixed caliper body. Where the spindle nut is located within the inboard portion, the one or more stops may be located on the outboard portion, or vice versa. The one or more stops may include a boss. The boss may extend from a surface of the fixed caliper body. The boss may extend from the surface by a distance of about 0.2 mm or more, 0.4 mm or more, 0.6 mm or more, 0.8 mm or more, or even 1.0 mm or more. The boss may extend from the surface by a distance of about 2.0 mm or less, 1.8 mm or less, 1.6 mm or less, 1.4 mm or less, or even 1.2 mm or less.

The stop may be circular, polygonal (e.g., square or rectangular), or any other suitable shape.

The stop may be formed by casting, material removal, or both. A surface of the stop that contacts the sliding caliper body may be subjected to material removal to provide a flat, smooth surface to be contacted by the sliding caliper body. In this regard, any surface roughness and/or angles (e.g., draft angles) of the stop derivative of a casting process may be eliminated by material removal. Moreover, material removal may provide lesser tolerances relative to casting. Preferably, the stop and the sliding caliper body may engage each other by a flat, face-to-face contact.

The stop may be located such that it does not interfere with any connection or movement of the brake system other than the sliding caliper body. In this regard, the fixed caliper body may comprise one or more connection members by which the inboard and outboard portions connect together; one or more cylinders that receive pistons, as discussed hereinbefore; one or more holes for receiving guide pins that guide the axial translation of the sliding caliper body with respect to the fixed caliper body; one or more slots that receive one or more brake pads (e.g., tabs or wings of the brake pad that locate within the slots); or any combination thereof. The stop may be located between two or more of the connection members, cylinders, holes, and slots.

Moreover, the fixed caliper body may comprise one or more grooves provided for material and weight reduction. Thus, the stop may be located to accommodate the grooves.

Typically, the fingers of the sliding caliper body may include two fingers. In this manner, symmetrical force may be applied to at least a portion of the brake pad. Moreover, the two fingers may be located on opposing sides of the cylinder formed in the fixed caliper body, so they do not interfere with the piston. The present teachings contemplate that one, or even more than two fingers may be employed.

The fixed caliper body may comprise one stop that contacts one finger. The fixed caliper body may comprise two or more stops that contact one finger. The fixed caliper body may comprise one stop that contacts two or more fingers. That is, the stop may be formed as a continuous boss extending around the cylinder such that it contacts two or more fingers. The fixed caliper body may comprise two or more stops, each contacting a respective finger.

The sliding caliper body may comprise one or more engagement features. The engagement feature may function to contact the stop formed in the fixed caliper body (e.g., the outboard portion). The engagement feature may be located on one or more fingers of the sliding caliper body.

The engagement feature may be a boss or recessed portion of one or more fingers. The boss or recess may be formed by casting and/or material removal of the sliding caliper body after casting (e.g., metal casting). A surface of the engagement feature that contacts the stop may be subjected to material removal to provide a flat, smooth surface to be contacted by the stop. In this regard, any surface roughness and/or angles (e.g., draft angles) of the stop derivative of a casting process may be eliminated by material removal. Moreover, material removal may provide lesser tolerances relative to casting. Preferably, the engagement feature and the stop may engage each other by a flat, face-to-face contact.

Typically, at least some surfaces of metal casted parts may have a draft angle applied thereto for aiding in releasing the part from the mold. Due to casting tolerances, it can be difficult to predict what portion of the angled surface of the sliding caliper will contact which portion of an angled surface of the fixed caliper body. Moreover, heads of guide pins extending through both of the fixed and sliding caliper bodies may seat better on flat surfaces. Thus, at least one surface of the fixed and sliding caliper bodies may be subjected to material removal to promote a flat, face-to-face contact between the stop and the engagement feature.

The present disclosure provides for a method for performing a release operation with a brake system. The method may comprise one or more of the following steps. Some of the steps may be duplicated, eliminated, rearranged relative to other steps, combined into one or more steps, separated into two or more steps, or any combination thereof.

The method may comprise driving a spindle nut, by a spindle, during a release operation in a second direction until the spindle nut contacts a fixed caliper body. In a brake system with a spindle nut located within an inboard portion of the fixed caliper body, the second direction may be the inboard direction.

The spindle nut may contact an inboard portion of the fixed caliper body. An engagement feature of the spindle nut may contact a stop of the fixed caliper body. The spindle nut may cease movement upon contacting the fixed caliper body.

The spindle may be driven by a motor and/or one or more linkages disposed between the motor and the spindle nut. The spindle may angularly translate while the spindle nut axially translates during driving.

As the spindle is driven in the release operation, the sliding caliper body may axially translate in the first direction to release a force applied by the outboard brake pad from the rotor. The sliding caliper body may axially translate a first distance prior to the spindle nut contacting the fixed caliper body. The first distance may be the running clearance realized during normal vehicle operation.

The method may comprise continuing to drive the spindle to drive a sliding caliper in a first direction opposing the second direction. The sliding caliper body may be driven in the first direction until the sliding caliper body contacts the fixed caliper body (e.g., the outboard portion). An engagement feature of the sliding caliper body may contact a stop of the fixed caliper body. The sliding caliper body may axially translate a second distance after the spindle nut contacts the fixed caliper body and until the sliding caliper body contacts the fixed caliper body. The second distance may be greater than the first distance.

Due to the threaded engagement of the spindle with the spindle nut, and captivation of the spindle nut upon contacting the fixed caliper body, the spindle, while angularly translating, may also axially translate in a second direction. Due to the coupling of the spindle with the sliding caliper body, axial translation of the spindle causes corresponding axial translation of the fixed caliper body.

The release operation may be performed to reset the brake system. Reset may occur during and/or after servicing of the brake system.

During the release operation, a braking force of an inboard brake pad and/or an outboard brake pad may be released from a rotor. Driving the spindle nut in the second direction may release the force of an inboard brake pad. Driving the sliding caliper body in the first direction may release the force of an outboard brake pad.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use. Other combinations are also possible as will be gleaned from the following claims, which are also hereby incorporated by reference into this written description.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

The disclosures of all articles and references, including patent applications and publications, are incorporated by reference for all purposes.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers, and/or sections, these elements, components, regions, layers, and/or sections should not be limited by these terms. These terms may be used to distinguish one element, component, region, layer, and/or section from another element, component, region, layer, and/or section. Terms such as "first," "second," and other numerical terms when used herein do not imply a sequence or order unless clearly indicated by the context. Thus, a first element, component, region, layer, and/or section discussed below could be termed a second element, component, region, layer, and/or section without departing from the teachings.

The use of "about" or "approximately" in connection with a range applies to both ends of the range. Thus, "about 20 to 30" is intended to cover "about 20 to about 30", inclusive of at least the specified endpoints.

Unless otherwise stated, any numerical values recited herein include both endpoints and all values from the lower value to the upper value in increments of one unit provided that there is a separation of at least 2 units between any lower value and any higher value. As an example, if it is stated that the amount of a component, a property, or a value of a process variable such as, for example, temperature, time, and the like is, for example, from 1 to 90, from 20 to 80, or from 30 to 70, it is intended that intermediate range values such as (e.g., 15 to 85, 22 to 68, 43 to 51, 30 to 32, etc.) are within the teachings of this specification. Likewise, individual intermediate values are also within the present teachings. For values which are less than one, one unit is considered to be 0.0001, 0.001, 0.01, or 0.1 as appropriate. These are only examples of what is specifically intended and all possible combinations of numerical values between the lowest value and the highest value enumerated are to be considered to be expressly stated in this application in a similar manner.

The term "consisting essentially of" to describe a combination shall include the elements, components, or steps identified, and such other elements, components, or steps that do not materially affect the basic and novel characteristics of the combination. The use of the terms "comprising" or "including" to describe combinations of elements, components, or steps herein also contemplates embodiments that consist essentially of the elements, components, or steps.

REFERENCE NUMERALS

10 Brake system
12 Fixed caliper body

14 Sliding caliper body
16 Inboard portion of the fixed caliper body
18 Outboard portion of the fixed caliper body
20 Inboard brake pad
22 Outboard brake pad
24A Inboard cylinder
24B Outboard cylinder
26A Inboard piston
26B Outboard piston
28 Motor gear unit housing
30 Spindle
32 Spindle nut
34 First direction
36 Second direction
38 Bearing
40 Base of the sliding caliper
42 Bridge of the sliding caliper
44 Finger of the sliding caliper
46 Flange of the spindle
48A First side of the flange
48B Second side of the flange
50 Engagement feature of the spindle nut
52 End portion of the spindle nut
54 First passage
56 Second passage
58 Stop of the inboard portion of the fixed caliper body
60 Engagement feature of the finger
62 Stop of the outboard portion of the fixed caliper body
64 Hole for guide pin
66 Slot for brake pad
68 Connection member
R1 First radius
R2 Second radius

What is claimed is:

1. A brake system comprising:
a sliding caliper body translatable at least in a first direction; and
a fixed caliper body having a first stop formed therein and accommodating a spindle nut that contacts the first stop in a release operation; and
a spindle that drives the spindle nut in a second direction during the release operation, wherein continued translation of the spindle after contact of the spindle nut with the first stop drives the sliding caliper body in the first direction, which is opposing the second direction.

2. The brake system according to claim 1, wherein the first stop is in the form of a step formed at least partially around a circumference of a first passage extending through the fixed caliper body, the step extending from a radius of the first passage to a radius of a second passage, and the radius of the second passage being smaller than the radius of the first passage.

3. The brake system according to claim 2, wherein the spindle nut comprises an engagement feature that contacts the first stop formed in the fixed caliper body.

4. The brake system according to claim 3, wherein the engagement feature is in the form of a step formed at least partially around a circumference of the spindle nut, the step extending from a first radius of the spindle nut to a second radius of the spindle nut, and the second radius being smaller than the first radius.

5. The brake system according to claim 4, wherein an end portion of the spindle nut defined by the second radius thereof locates within the second passage.

6. The brake system according to claim 5, wherein the fixed caliper body comprises a second stop that mates with the sliding caliper body in the release operation; and wherein the second stop precludes further translation of the spindle and driving of the sliding caliper body in the second direction.

7. The brake system according to claim 6, wherein the second stop is formed on an outboard portion and/or an inboard portion of the fixed caliper body.

8. The brake system according to claim 7, wherein the second stop is a boss extending from the outboard portion of the fixed caliper body.

9. The brake system according to claim 8, wherein the boss is located between two or more of a connection member, a guide pin hole, a brake pad slot, a first cylinder, and a second cylinder.

10. The brake system according to claim 9, wherein the sliding caliper body comprises a finger, and the finger comprises an engagement feature in the form of a recessed surface.

11. The brake system according to claim 10, wherein the brake system comprises an inboard brake pad and an outboard brake pad adapted to locate on opposing sides of a rotor; and wherein contact of the sliding caliper body with the second stop provides a clearance between the outboard brake pad and the rotor that is greater than a running clearance.

12. The brake system according to claim 1, wherein the release operations of the sliding caliper body and the fixed caliper body at least partially overlap in time.

13. A method for performing a release operation with a brake system, the method comprising:

driving a spindle nut, by a spindle, during the release operation in a second direction until the spindle nut contacts a fixed caliper body, continuing to drive the spindle to drive a sliding caliper body in a first direction opposing the second direction.

14. The method according to claim 13, wherein the spindle nut contacts an inboard portion of the fixed caliper body.

15. The method according to claim 14, wherein an engagement feature in the form of a step formed in the spindle nut mates with a stop in the form of a step formed in the fixed caliper body.

16. The method according to claim 15, wherein the sliding caliper body is driven in the first direction until it contacts the fixed caliper body.

17. The method according to claim 16, wherein the sliding caliper body contacts an outboard portion and/or the inboard portion of the fixed caliper body.

18. The method according to claim 17, wherein an engagement feature in the form of a recessed surface in the sliding caliper body mates with a stop in the form of a boss formed in the outboard portion of the fixed caliper body.

19. The method according to claim 13, wherein the method comprises releasing a braking force of an inboard brake pad against a rotor by the driving of the spindle nut in the second direction; and wherein the method comprises releasing a braking force of an outboard brake pad against the rotor by the driving the sliding caliper body in the first direction.

20. The method according to claim 13, wherein the release operation is performed to reset the brake system.

\* \* \* \* \*